US008452839B2

(12) United States Patent
Heikes et al.

(10) Patent No.: US 8,452,839 B2
(45) Date of Patent: May 28, 2013

(54) OFFLINE AWAY MESSAGES

(75) Inventors: Brian D. Heikes, Ashburn, VA (US);
James A. Odell, Potomac Falls, VA
(US); Andrew L. Wick, McLean, VA
(US); Deborah R. Yurow, Arlington, VA
(US)

(73) Assignee: AOL Inc., Dulles, VA (US)

( * ) Notice: Subject to any disclaimer, the term of this patent is extended or adjusted under 35 U.S.C. 154(b) by 2378 days.

(21) Appl. No.: 11/019,538

(22) Filed: Dec. 23, 2004

(65) Prior Publication Data
US 2006/0140361 A1 Jun. 29, 2006

(51) Int. Cl.
G06F 15/16 (2006.01)

(52) U.S. Cl.
USPC ........................................ 709/206; 709/204

(58) Field of Classification Search
USPC .................................. 709/204, 206
See application file for complete search history.

(56) References Cited

U.S. PATENT DOCUMENTS

| | | | |
|---|---|---|---|
| 6,301,609 B1 * | 10/2001 | Aravamudan et al. | 709/207 |
| 7,184,524 B2 * | 2/2007 | Digate et al. | 379/88.17 |
| 7,191,213 B1 * | 3/2007 | Bouchard et al. | 709/204 |
| 7,254,610 B1 * | 8/2007 | Turner et al. | 709/204 |
| 2002/0065894 A1 * | 5/2002 | Dalal et al. | 709/206 |
| 2002/0130904 A1 * | 9/2002 | Becker et al. | 345/753 |
| 2003/0120732 A1 | 6/2003 | Couts et al. | |
| 2003/0225843 A1 * | 12/2003 | Sakata | 709/206 |
| 2004/0003042 A1 * | 1/2004 | Horvitz et al. | 709/204 |
| 2004/0003084 A1 * | 1/2004 | Malik et al. | 709/225 |
| 2004/0103149 A1 * | 5/2004 | Tanigawa et al. | 709/204 |
| 2004/0148346 A1 * | 7/2004 | Weaver et al. | 709/204 |
| 2004/0153506 A1 * | 8/2004 | Ito et al. | 709/204 |
| 2004/0161090 A1 * | 8/2004 | Digate et al. | 379/202.01 |
| 2005/0071427 A1 * | 3/2005 | Dorner et al. | 709/204 |
| 2005/0091314 A1 * | 4/2005 | Blagsvedt et al. | 709/204 |
| 2005/0108329 A1 * | 5/2005 | Weaver et al. | 709/204 |
| 2005/0198131 A1 * | 9/2005 | Appelman et al. | 709/204 |
| 2006/0004911 A1 * | 1/2006 | Becker et al. | 709/207 |
| 2006/0167991 A1 * | 7/2006 | Heikes et al. | 709/204 |
| 2007/0220092 A1 * | 9/2007 | Heitzeberg et al. | 709/204 |

FOREIGN PATENT DOCUMENTS

EP 1 255 414 A2 11/2002

OTHER PUBLICATIONS http://web.mit.edu/olh/Zephry, "Zephyr on Athena (AC-34) Draft Table of Contents," Nov. 18, 2002, 25 pages.
http://www.stanford.edu/~kmitev/zephyr.html, "UNIX: Using Zephyr on Glue and WAM," Nov. 18, 2002, 8 pages.

(Continued)

*Primary Examiner* — Minh-Chau Nguyen
(74) *Attorney, Agent, or Firm* — Finnegan, Henderson, Farabow, Garrett & Dunner LLP

(57) ABSTRACT

A computer program or method provides away messages from a first user to other users of a communications system, where the first user has grouped the other users into two or more groups. An interface is provided to the first user that displays representations of the other users in a manner that identifies how the first user has grouped the other users into the groups. The first user is able to select a selected group from the groups using the interface. The first user also is able to set a group away message for the selected group using the interface. The group away message is sent to a second user that has been grouped in the selected group when the second user attempts to communicate with the first user using the communications system and the first user is offline.

5 Claims, 19 Drawing Sheets

OTHER PUBLICATIONS http://office.microsoft.com/assistance/2002/articles/Olrwautoreply2.aspx, "Have Microsoft Exchange Server Send Custom Reply Messages with Outlook 2002," Mar. 11, 2003, 1 page.
http://www.fnal.gov/docs/products/zephyr.html, "zephyr—Zephyr Notification Service," Nov. 18, 2002, 2 pages.
http://support.gfi.com/manuals/en/mes8/configuringautoreplies2.htm, "Configuring Auto Replies," Jun. 4, 2003, 2 pages.
http://www.brunoblondeau.com/macresponder/, "MacResponder Automated E-mail Responder for When Your Unavailable," Jun. 20, 2003, 6 pages.
http://andy.w2s.co.uk/yahoo.YEmotePlus/emote.htm, "YEmote2+ Yahoo Messenger Utilities# Away Message," Apr. 15, 2004, 10 pages.
http://help.yahoo.com/help/us/mesg/use/use-42.html, "Yahoo! Help—Yahoo! Messenger—Windows Version," Apr. 15, 2004, 2 pages.
http://www.phrack.org/show.php?p=37&a=7, "www.phrak.org," Apr. 15, 2005, 12 pages.
http://www.yrl.co.uk/~phil/vms/vms_tutorial.html, "Phil's VMS Tutorial", Apr. 15, 2004, 38 pages.
Office Action dated Apr. 19, 2012, issued by the State Intellectual Property Office of the People's Republic of China for Chinese Application No. 200580047604.0, with English language translation thereof.
European Search Report, issued by the European Patent Office for PCT/US2005046753, dated Jan. 27, 2012.
Office Action dated Nov. 10, 2011, issued by the State Intellectual Property Office of the People's Republic of China for Chinese Application No. 200580047604.0, with English language translation thereof.

* cited by examiner

OFFLINE AWAY MESSAGES

TECHNICAL FIELD

This description relates to offline away messages used in instant messaging.

BACKGROUND

With the advent of the Internet and a decline in computer prices, many people are communicating with one another through computers interconnected by networks. A number of different communications programs have been developed to facilitate such communications between computer users. One type of communication program is the instant messaging (IM) client program. An IM client program typically has a user interface that presents representations of a user's selected buddies (i.e., other users of the IM program selected by the user). When a buddy's IM client program is connected to the network and the buddy is available, a user may communicate or interact with the buddy using the IM client program. For example, the user may use the IM client program to engage in a real-time textual messaging session with the buddy.

At times, a user may be away from his or her computer or otherwise unavailable to engage in communications with a buddy, even though his or her IM client program is connected to the network or otherwise available for communications. In such a situation, a user typically is considered to be "away." Some IM client programs allow users to configure a preset and global "away message" that is sent as a textual message to any buddy that attempts to message the user while the user's IM client program is configured in an away mode.

At other times, a user may be offline. An offline user is unavailable to engage in communications with a buddy because the user's IM client program is not connected to the network. An offline user may remain offline and unavailable to communicate for an extended period of time.

SUMMARY

Offline away messages, including customized offline away messages, may be provided to buddies of an instant messaging program user who try to communicate with the user through the instant messaging program while the user is offline. An interface displays representations of the user's buddies in a manner that identifies one or more buddy groups and the membership of particular buddies within one or more of those buddy groups. The user may use the interface to define a global offline away message, a group offline away message for a selected buddy group, or a personal offline away message for a selected buddy. An appropriate global, group or personal offline away message then is sent to a buddy that attempts to communicate with the user through the instant messaging program when the user is away. A hierarchy may be used to decide which offline away message is sent to a particular buddy when multiple options are available. For example, a buddy for whom a personal away message has been defined will not be sent a group or global message, and a buddy for whom a group away message has been defined will not be sent a global message.

The interface may be included as a part of an instant messaging program. The interface may include first and second interface elements that enable the user to set customized offline away messages on a per-buddy or per-group basis. The first interface element displays representations of the buddies in a manner that identifies one or more buddy groups and the membership of buddies within one or more of those buddy groups, and the second interface element allows the user to enter a message.

In one aspect, a method provides away messages from a first user to other users of a communications system, where the first user has grouped the other users into two or more groups. An interface is provided to the first user that displays representations of the other users in a manner that identifies how the first user has grouped the other users into the groups. The first user is able to select a selected group from the groups using the interface. The first user also is able to set a group away message for the selected group using the interface. The group away message is sent to a second user that has been grouped in the selected group when the second user attempts to communicate with the first user using the communications system and the first user is offline.

Implementations of this aspect may include one or more of the following features. The method may include enabling the first user to select the second user using the interface; enabling the first user to set a personal away message for the second user using the interface; and sending the personal away message to the second user when the second user attempts to communicate with the first user using the communications system and the first user is offline. The personal away message may be appended to the group away message or may override the group away message.

The method may include enabling the first user to set a global away message; and sending the global away message to the second user when the second user attempts to communicate with the first user using the communications system and the first user is offline. The group away message may be appended to the global away message. The method may further include enabling the first user to select the second user using the interface; enabling the first user to set a personal away message for the second user using the interface; and sending the personal away message to the second user when the second user attempts to communicate with the first user using the communications system and the first user is offline. The personal away message may be appended to the group away message, which may be appended to the global away message. Alternatively, the personal away message may override the global away message and the group away message. The communications system may include an instant messaging system. The other users may include buddies of the first user. The groups may include buddy lists.

In another aspect, a method provides away messages to buddies of an instant messaging program user. An interface is provided that displays a representation of a buddy group and a representation of a buddy included in the buddy group The representation of the buddy group and the representation of the buddy are displayed in a manner that indicates the buddy is included in the buddy group. Using the interface, the user is able to set a global away message, a group away message for the buddy group, and a personal away message for the buddy. The method includes sending one or more of the global away message, the group away message, and the personal away message to the buddy in response to the buddy attempting to communicate with the user through the instant messaging program when the user is offline.

Implementations of this aspect may include one or more of the following features. Only the personal away message may be sent if the user has set the personal away message. Only the group away message may be sent if the user has set the group away message. Only the global away message may be sent if the user has set the global away message without setting the group away message and the personal away message. The personal away message may be appended to the group away message, which may be appended to the global away message if the user has set the personal away message. The group away message may be appended to the group away message if the user has set the group away message. The user may be able to append the personal away message to one or both of the global away message and the group away message using the interface. The user may be able to append the group away message to the global away message using the interface.

Implementations of the described techniques may include hardware, a method or process, or computer software on a computer-accessible medium.

Other features will be apparent from the description and drawings, and from the claims.

DETAILED DESCRIPTION

Figure 1:
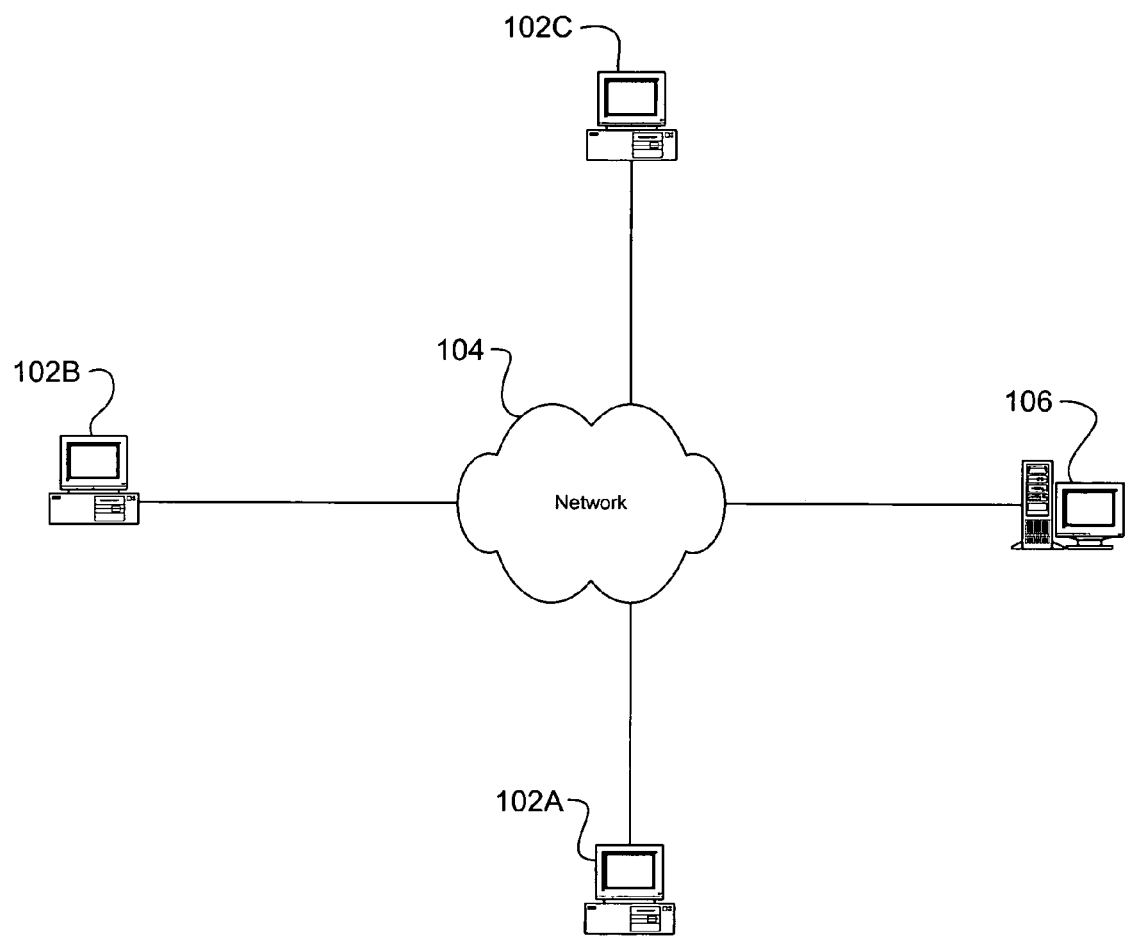
FIG. 1 is a diagram of an exemplary networked computing environment that may support instant messaging communications.

Through the described techniques, host-based, offline away messages are provided to users of a communications system having an online presence attribute, such as instant messaging systems or chat systems. The offline away messages allow a user to provide information to other users ("buddies") when the user is offline, especially when the user may not be online again for some time.

In general, an interface is provided to the user of an instant messaging client program. The interface displays the user's buddies in a manner that identifies one or more buddy groups, and the membership of buddies within one or more of those buddy groups. The user may use the interface to set customized or uncustomized offline away messages on a global basis, a buddy group basis, a personal buddy basis, or otherwise. The offline away messages are sent by a host system to buddies who have sent instant messages to the user while the user is offline.

The user interface enables the user to easily and intuitively configure customized away messages based upon the personal identity of the instant messaging sender or the group to which the instant messaging sender belongs. For example, one particular offline away message may be sent to a family member associated with a family group on the user's buddy list, a different offline away message may be sent to members associated with a co-workers group on the user's buddy list, and yet a different offline away message may be sent to the personal screen name of the user's boss who is also associated with the co-workers group on the user's buddy list.

The offline away messages may be used to provide a pseudo-online state for the user while the user is offline. The pseudo-online state may have similar or different attributes from an online state of a user who is online. The pseudo-online state may be provided by the host system to permit offline users to project a presence to buddies. When a buddy tries to send a message to the user, the host sends to the buddy an offline away message that was designated by the user. The message may convey, for example, information that the user is offline and will not return back online for a certain period of time due to circumstances such as, for example, travel or vacation.

Various techniques may be used to distinguish a user who is in the pseudo-online state from other users who are in a normal online or offline state. For example, a font change may be made to visually distinguish users who are in the pseudo-online state. In one example, the screen name of a user in a pseudo-online state may appear in the buddy list of another user with a red font and bold italics typeface. In another example, an icon or other visual indication is displayed next to the screen name of an offline user to indicate that, though the user is offline, the user has an offline away message available. In another example, when a user moves a mouse pointer over the screen name of an offline buddy in the user's buddy list, an offline away message, if available, is displayed to the user in a pop-up window.

FIG. 1 illustrates an exemplary networked computing environment 100 that may support instant messaging communications. Computer users are distributed geographically and communicate using client systems 102A, 102B, and 102C that are interconnected by a network 104. Client systems 102A, 102B, and 102C are connected to network 104 through various communication media, such as a modem connected to a telephone line (using, for example, serial line internet protocol (SLIP) or point-to-point protocol (PPP)) or a direct Internet connection (using, for example, transmission control protocol/internet protocol (TCP/IP)). A host system 106 connected to network 104 facilitates direct and indirect communications between the client systems 102A, 102B, and 102C.

Each of the client systems 102A, 102B, and 102C and the host system 106 may be implemented using, for example, a general-purpose computer capable of responding to and executing instructions in a defined manner, a personal computer, a special-purpose computer, a workstation, a system, a device, a component, or other equipment or some combination thereof capable of responding to and executing instructions. Client systems 102A, 102B, and 102C and host system 106 may receive instructions from, for example, a software application, a program, a piece of code, a device, a computer, a computer system, or a combination thereof, which independently or collectively direct operations of the systems. These instructions may take the form of one or more communications programs that facilitate communications between the users of client systems 102A, 102B, and 102C. Such communications programs may include, for example, electronic mail (e-mail) programs, instant messaging (IM) programs, file transfer protocol (FTP) programs, or voice-over-IP (VoIP) programs. The instructions may be embodied permanently or temporarily in any type of machine, component, equipment, storage medium, or propagated signal that is capable of being delivered to a client system 102A, 102B, and 102C, or the host system 106.

Each of client systems 102A, 102B, and 102C and host system 106 includes a communications interface (not shown) used by the communications programs to send communications through network 104. The communications may include e-mail, audio data, video data, general binary data, or text data (e.g., data encoded in American Standard Code for Information Interchange (ASCII) format).

Examples of the network 104 include the Internet, Wide Area Networks (WANs), Local Area Networks (LANs), analog or digital wired and wireless telephone networks (e.g., a Public Switched Telephone Network (PSTN), an Integrated Services Digital Network (ISDN), or a Digital Subscriber Line (xDSL)), or any other wired or wireless network. The network 104 may include multiple networks or sub-networks, each of which may include, for example, a wired or wireless data pathway.

IM client programs executing on client systems 102A, 102B, and 102C may use an IM server provided by the host system 106 to assist in communications between users. When a user is connected to the network 104 and executes the IM client program, the IM client program contacts the host system 106 and logs the user onto the host system 106. The host system 106 informs the IM client program when the program user's buddies are online and facilitates communications between the program user and a buddy. Thus, once logged on to the host system 106, a user may use the IM client program to view whether particular buddies are online, to exchange IMs with particular buddies, to participate in group chat rooms, or to trade files such as pictures, invitations or documents. The program user also may be able to find other buddies with similar interests, get customized information such as news and stock quotes, and search the World Wide Web.

The host system 106 may support IM services irrespective of a program user's network or Internet access. Thus, host system 106 may allow users to send and receive IMs, regardless of whether they have access to any particular Internet service provider (ISP). The host system 106 also may support associated services, such as administrative matters, advertising, directory services, chat, and interest groups related to IM. To transfer data, the host system 106 employs one or more standard or proprietary IM protocols.

Host system 106 may assist IM communications between users of IM client programs by facilitating the establishment of a peer-to-peer communication session between the IM client programs. In some implementations, the host system 106 may assist IM communications by directly routing communications between the IM client programs.

Figure 2A:
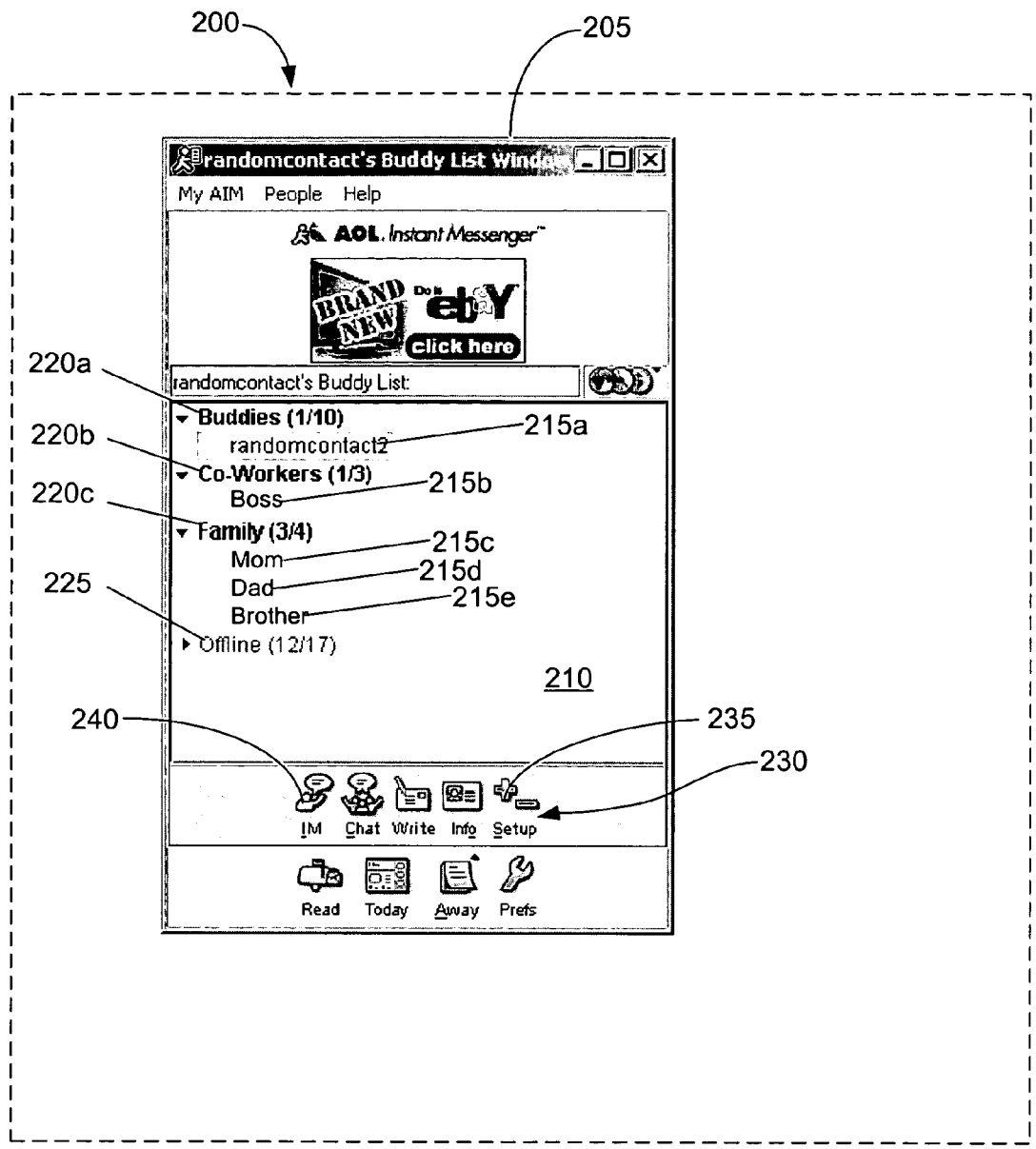
FIG. 2A is an exemplary interface presented to a user when an instant messaging client program is running on one of the client systems of FIG. 1.

FIG. 2A illustrates an exemplary interface presented to a user (e.g., "randomcontact") when an IM client program is running on one of the client systems 102A, 102B, and 102C. IM programs typically allow users to communicate in real-time with each other in a variety of ways. For example, many IM programs allow users to send text as an instant message, to transfer files, and to communicate by voice. Examples of IM programs include America Online Instant Messenger® (AIM®), Yahoo! Messenger®, MSN Messenger®, and ICQ.

A desktop 200 includes a user interface 205 of the IM client program. User interface 205 has a box 210 that displays representations 215a-215e of the program user's buddies. In the interface 205, the representations 215a-215e are icons showing the screennames of the buddies; however, other types or forms of representations may be used. The representations 215a-215e may provide contextual information to the program user about the buddy, such as whether the buddy is online, how long the buddy has been online, whether the buddy is away, or whether the buddy is using a mobile device.

The list of buddies displayed in box 210 typically is referred to as the buddy list. In the buddy list, buddies are grouped together into buddy groups. Representations 220a-220c of each buddy group are displayed in the buddy list. When a buddy's IM client program is able to receive communications, the representation of the buddy in the buddy list is displayed or visually modified under the name or representation of the buddy group that includes the buddy. For example, in the interface shown by FIG. 2A, the buddy whose screenname is "randomcontact2" is part of the "Buddies" buddy group and, consequently, the representation 215a for randomcontact2 is listed under the representation 220a for the Buddies buddy group. Likewise, the buddy whose screenname is "Boss" is part of the "Co-Workers" buddy group and, consequently, the representation 215b for Boss is listed under the representation 220b for the Co-Workers buddy group. Similarly, the buddies whose screennames are "Mom," "Dad," and "Brother" are part of the "Family" buddy group 220c and, consequently, their representations 215c-215e are listed under the representation 220c for the Family buddy group.

When a buddy is offline, the representation of the buddy typically is listed under the representation 225 for an "Offline" buddy group. When a buddy's IM client program moves from an offline state to an online state that is able to receive communications, the representation of the buddy may be visually modified and moved from the Offline buddy group to the buddy group that includes the buddy. Similarly, when the buddy's IM client program moves from an online state to an offline state and becomes unable to receive communications, the representation of the buddy may be visually modified and moved from the buddy group to the Offline buddy group. In another implementation, when a buddy's IM client program moves from an online state to an offline state, a visual indication is provided for that buddy. The visual indication distinguishes an offline state from an online state and may be, for example, an icon placed in proximity to the buddy's screen name on the buddy list or a visual change in the buddy's screen name on the buddy list, such as a change in font and/or color. The visual indication is removed when the buddy's IM program moves from an offline state to an online state. In another implementation, no overt visual change is made when the buddy's IM client program moves between an online state and an offline state.

Figure 2B:
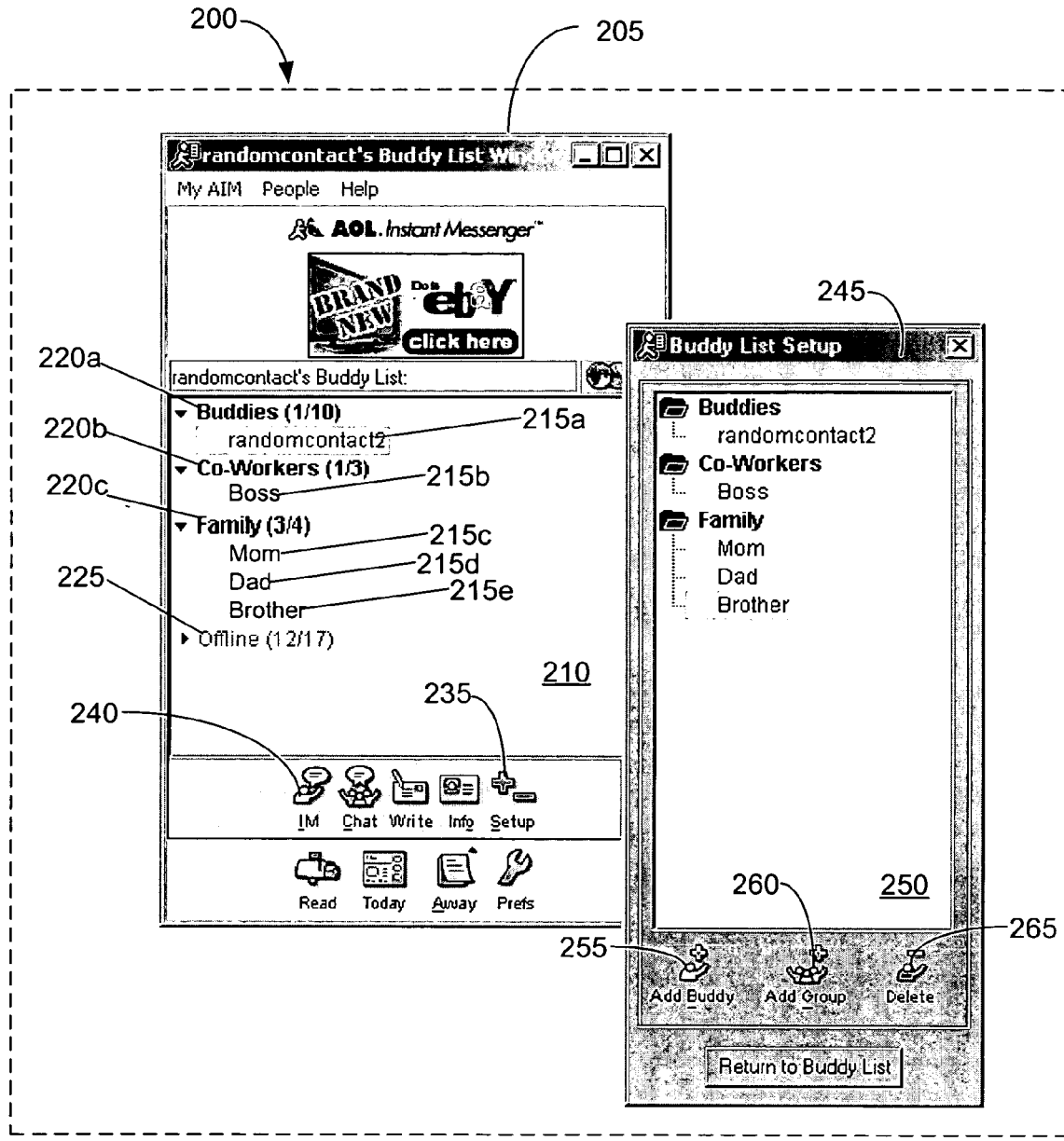
FIG. 2B is an exemplary window that may be used to configure a buddy list of an instant messaging client program.

Referring also to FIG. 2B, the user may configure the buddy list by adding, deleting, or renaming buddy groups and by changing the relationship of one or more buddies with respect to a buddy group (e.g., by adding buddies to or deleting buddies from each buddy group, or by making one buddy group relate to another buddy group). FIG. 2B shows a window 245 that may be invoked for configuring the buddy list. Window 245 is accessed, for example, by actuating a Set-Up icon 235 on interface 205, such as by clicking on the Set Up icon 235 with a mouse. Window 245 includes a list box 250 that contains a list of buddy groups and screennames that correspond to the buddy list displayed in user interface 205, absent the offline buddy group. When the user makes changes to the list in the window 245, those changes are reflected in the buddy list displayed in interface 205.

To allow a user to make changes to the list in list box 250, window 245 includes an Add Buddy button 255, an Add Group button 260, and a Delete button 265. Other buttons or interfaces may be used for configuring the buddy list. To add a buddy group, the user selects the Add Group button 260 and enters the name of the new buddy group, which is added to list box 250. To add a buddy to a buddy group, the user selects the buddy group, selects the Add Buddy button 255, and enters the screenname or other identifier of the buddy. The buddy is then listed under the selected buddy group. For instance, to create the Family buddy group 220c, the user selected the Add Group button 260 in window 245 and entered "Family." This buddy group was then added to the list in list box 250 and, consequently, added to the buddy list displayed in interface 205. To add each of the group members (Mom, Dad, and Brother), the user selected the Family buddy group listed in list box 250, selected the Add Buddy button 255, and entered in the screenname of the group member. This was repeated until all group members were added. To remove buddies or groups, the user selects the buddy or group and then selects the Delete button 265. A buddy may be moved from one group to another by using a mouse to drag the buddy's screenname between the groups. A buddy may occupy more than one buddy group.

When a buddy is online, the program user may use the IM client program to communicate or interact with the buddy in a number of ways. For instance, the program user can send an instant message to the buddy (typically in the form of text, audio, video, or other rich media). To send instant messages, a program user initiates an instant message session with a buddy. A program user may initiate the instant message session, for example, by double-clicking on a buddy's representation 215 or by first selecting a buddy and then selecting an "IM" icon 240. Starting a session may invoke a window in which messages can be typed or otherwise composed and sent back-and-forth between the program user and the buddy.

Figure 2C:
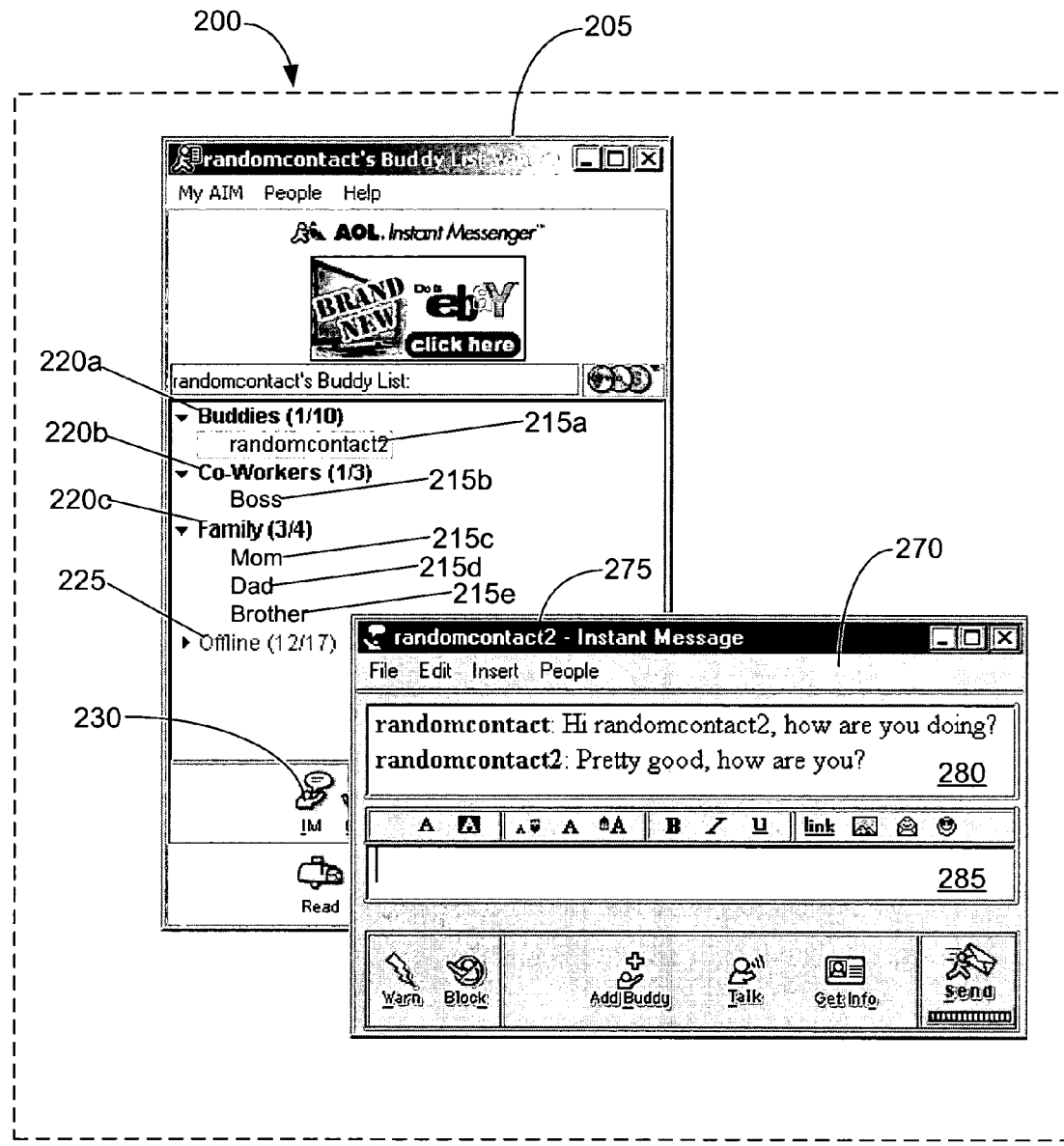
FIG. 2C is an exemplary instant messaging window presented when a user is engaged in a textual instant message session with a buddy.

FIG. 2C illustrates an exemplary IM window 270 presented when a user is engaged in a textual instant message session with a buddy. The window 270 includes a titlebar 275, in which the buddy's screenname (e.g., "randomcontact2") is shown. Window 270 includes a text box 280 and an edit box 285. A similar window is displayed on the buddy's client system.

The sent and received messages of the user and buddy are displayed in text box 280. The sender's (i.e., user's or buddy's) screenname may be listed beside the sender's corresponding message in text box 280. For instance, in the exemplary window shown, the user (whose screen name is "randomcontact") has typed and sent the message "Hi randomcontact2, how are you doing?" to the buddy (whose screenname is "randomcontact2"). The buddy has replied with the message "Pretty good, how are you?". To send a message, the user types the message in edit box 285 and activates a send command that may include, for example, pressing an ENTER key or clicking on a Send icon 232. In response, the entered text is displayed in text box 280 and in the textbox of the similar window displayed on the buddy's client system.

As described above, a user may be offline with his or her IM program disconnected from the network or otherwise unavailable for communications. When the IM client program is offline, the host system can automatically send an away message to a buddy that attempts to communicate with the user. The offline away message that is sent may be set or input by the user, or may be a default message.

When away messaging is being handled by host system 106, an offline mode may be entered (by host system 106) when the IM client program logs off of host system 106.

In general, host system 106 may be used to handle offline away messaging. That is, the IM client program acts as the interface for the user to set up offline away messaging, but away messages are sent to buddies by host system 106 when the user is offline. In another implementation, a client system other than the user's offline client system is used to send offline away messages. In yet another implementation, a third party server, such as a server available over the Internet, is used to send offline away messages. The offline away messaging may be offered as a fee-based service to users.

Figure 3:
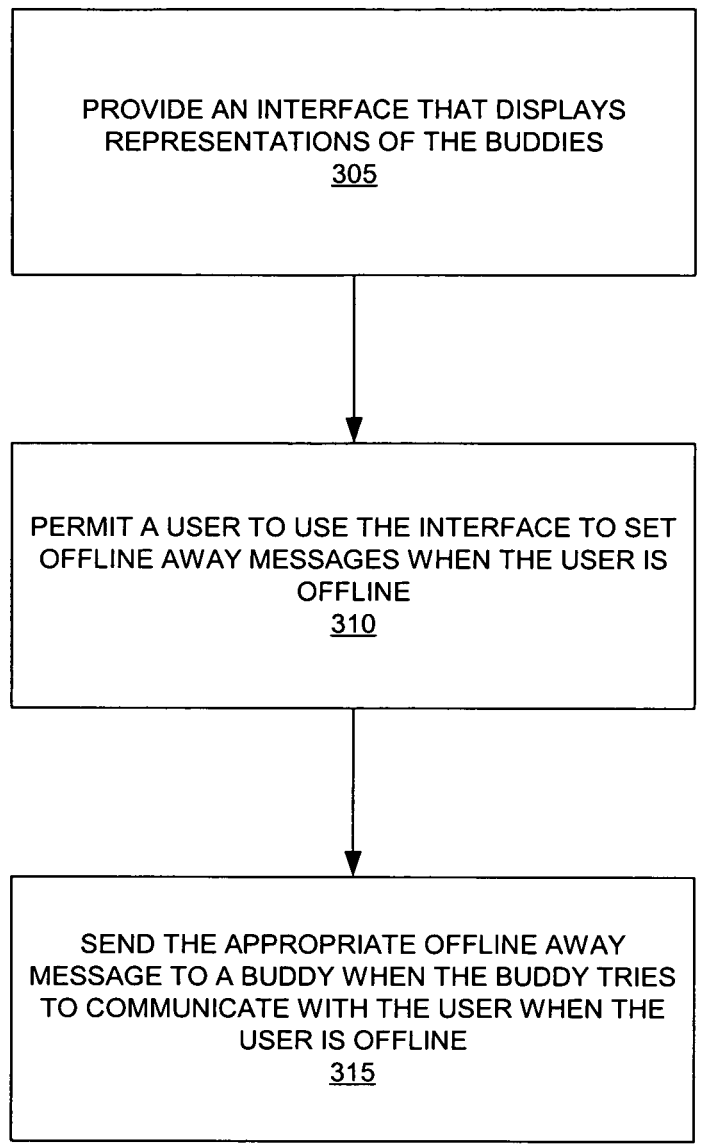
FIGS. 3-5 are exemplary flow charts illustrating methods for providing offline away messages to buddies that attempt to communicate with the user through an instant messaging client program while the user is offline.

FIG. 3 is a flow chart illustrating a method 300 for providing offline away messages, such as customized offline away messages, to buddies that attempt to communicate with the user through the IM client program while the user is offline. An interface is provided to the user (step 305). The interface displays representations of the user's buddies in a manner that identifies one or more buddy groups, and the membership of buddies within one or more of those buddy groups. For example, the interface may display the buddies in the same manner as user interface 205 shown in FIG. 2A, with the screennames of the buddies displayed underneath the name of the buddy groups that include the buddies. The interface may use various techniques of displaying the buddies in a manner that identifies one or more buddy groups, and the membership of buddies within one or more of those buddy groups may be used. Other techniques of displaying the buddies. The interface may be a graphical user interface (GUI) and may be composed of one or more windows in a windowing-based graphical environment (e.g., Microsoft Windows, Macintosh, X Windows).

The user may use the interface provided to set offline away messages, including customized offline away messages, on a global basis, a buddy group basis, and/or a personal buddy basis (step 310). To set a customized offline away message for a buddy-group, the user may use the interface to select the buddy group and enter an offline away message that will be used for all buddies that belong to the selected buddy group.

As noted, the user also may be able to use the interface to set a global offline away message and/or personal offline away messages on a per-buddy basis. A global offline away message is a default offline away message sent to a buddy if no other type of offline away message (e.g., buddy group offline away message or personal offline away message) is set for the buddy. A personal offline away message is a message that is set for a particular buddy and only used for that buddy.

A hierarchy of offline away messages may be implemented. For example, the group offline away message for a buddy group may be set by overriding the global offline away message with a new message, or by appending an additional message to the global offline away message. For example, if the global offline away message is set to "I am offline," then a buddy group offline away message may be set by appending "I will be back in an hour." to the global offline away message. In this case, the offline away message set for buddies in the selected buddy group would be "I am offline. I will be back in an hour." If the buddy group message was set by replacing the global away message, the offline away message set for buddies in the selected buddy group would be "I will be back in an hour." Similarly, in other implementations, the personal offline away message may be set by appending a new message to the group offline away message (or the global offline away message if no group offline away message exists) or by overriding a group offline away message or a global offline away message for particular buddies.

Appending may be implemented by concatenating each new message to the higher level message in the hierarchy and storing the resulting message as the personal or group offline away message. Following the example above, in this case the group message "I will be back in an hour." is concatenated to the global message "I am offline." when the user chooses to append. The resulting message then is stored as the group away message, which is sent to buddies in the group while the user is offline.

In another implementation, appending may be implemented by storing each message separately and concatenating each of the messages just prior to sending the away message to a buddy. Following the example above, in this case the message "I am offline." is stored as the global offline away message and the message "I will be back in an hour." is stored separately as the group offline away message, along with an indicator that the group offline away message is to be appended to the global away message. The group away message is concatenated to the global offline away message just prior to sending the offline away message to a buddy in the buddy group. The offline away message resulting from the concatenation then is sent to the buddy.

Default global offline away messages, default group offline away messages, or default personal offline away messages, may be provided, depending on the implementation. For example, if the Buddies buddy group is provided as a default upon installation of the IM client program, a default group offline away message also may be provided for the Buddies buddy group. As another example, a default global message may be provided when the IM client program is installed so that an offline away message always exists for the buddies, regardless of whether a user has personalized group or personal offline away messages. Similarly, a default group offline message may be provided for any default buddy groups and newly created buddy groups, whether or not a global offline away message is provided. This enables an offline away message to always exist for buddies even when no global away message exists, regardless of whether a user has set a group offline away message or a personal offline away message.

When a buddy tries to communicate with the intended recipient user through the IM client program while the user is offline, the appropriate offline away message is sent (step 315). For example, in an implementation having global offline away messages, group offline away messages, and personal offline away messages, a personal offline away message is sent to the buddy, if set; a group offline away message is sent, otherwise or additionally, if set; and a global offline away message is sent, otherwise or additionally, if set. As another example, in an implementation having global offline away messages and group offline away messages, the group offline away message for the group that includes the buddy is sent, if set; and the global offline away message is sent, otherwise or additionally, if set. In an implementation having only group offline away messages, the group offline away message for the group that includes the buddy is sent to the buddy, if set.

Figure 4:
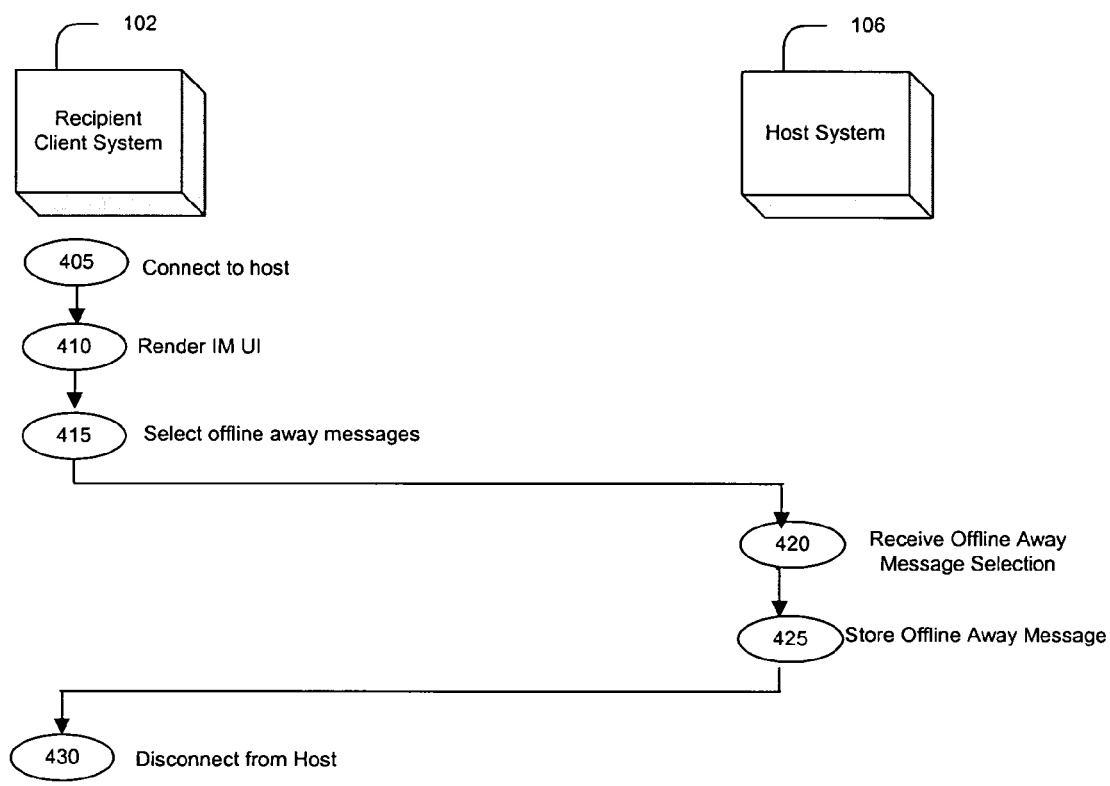

Referring to FIG. 4, a recipient client system 102A and a host system 106 communicate according to a procedure 400 that may be implemented by various types of hardware (e.g., a device, a computer, a computer system, equipment or a component); software (e.g., a program, an application, instructions or code); storage media (e.g., a disk, an external memory, an internal memory, or a propagated signal); or combinations thereof. First, the recipient client system 102A connects to the host system 106 (step 405). The recipient client system 102A and the host system 106 are physically and/or logically connected. For example, recipient client system 102A may connect to the host system 106 across a network (e.g., network 104) by supplying the user ID and password to the server (e.g., a login server) in order to obtain access to the host system 106.

Next, the recipient client system 102A renders an IM user interface (UI) (step 410). The IM UI includes controls to set an offline away message. Examples of an IM UI for setting an offline away message are discussed below with respect to FIGS. 6, 7A, 7B, and 7C.

The user selects an offline away message (step 415). The user may select from among a number of pre-stored away messages, or the user may create a customized offline away message. The user may select the offline away message to be a global offline away message, a group offline away message, or a personal offline away message. The IM UI may provide controls that enable the user to customize the offline away message. Examples of a user selecting an offline away message are discussed below with respect to FIGS. 6, 7A, 7B, and 7C. The user may select a different offline away message for each of a global away message, one or more group away messages, or one or more personal away messages. Alternatively, the user may select the same offline away message. Typically, the user will select the offline away message by manipulating the IM UI by, for example, clicking or dragging using a mouse or other input device.

Next, the host system 106 receives the offline away message selection (step 420). The offline away message selection that is received is the same as the offline away message selection made in step 415. The host system 106 may store the offline away message selection (step 425). Finally, the recipient client system 102A disconnects from the host (step 430).

Figure 5:
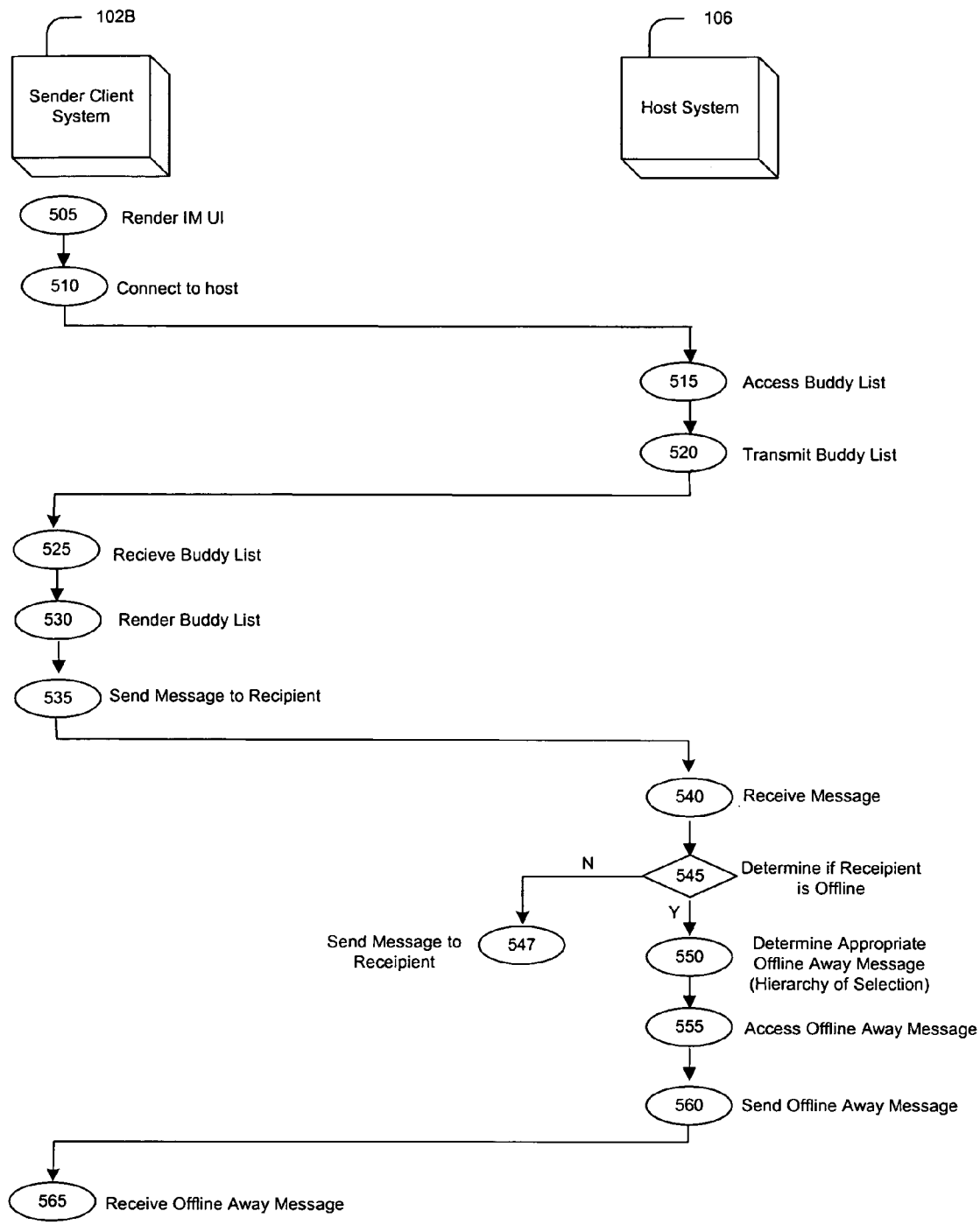

Referring to FIG. 5, a sender client system 102B and host system 106 communicate according to a procedure 500 that may be implemented by various types of hardware (e.g., a device, a computer, a computer system, equipment or a component); software (e.g., a program, an application, instructions or code); storage media (e.g., a disk, an external memory, an internal memory, or a propagated signal); or combinations thereof. Initially, the sender client system 102B renders an IM UI (step 505). The IM UI enables the sender client system 102B to communicate with other IM buddies. Typically, the IM UI enables the sender client system 102B to enter and send messages to various IM buddies and to receive and render messages from various IM buddies. Examples of an IM user interface are discussed above with respect to FIGS. 2A-2C.

Next, the sender client system 102B connects to the host system 106 (step 510). The sender client system 102B and the host system 106 are physically and/or logically connected. For example, the sender client system 102B may connect to the host system 106 across a network (e.g., network 104) by supplying a user ID and password to a server (e.g., a login server) in order to obtain access to the host system 106. The host system accesses the buddy list of the user using the sender client system 102B (step 515). The host system 106 transmits the buddy list to the sender client system 102B (step 520). The sender client system 102B receives the buddy list from the host system 106 (step 525) and renders the buddy list (step 530). Next, the user using the sender client system 102B sends a message to the recipient (step 535).

The host system 106 receives the message that was sent by the sender client system 102B (step 540). Next, the host system 106 determines if the intended recipient of the message is offline (step 545). If the intended recipient is not offline, then the host system 106 sends the message to the recipient (step 547) at recipient system 102A.

If, however, the intended recipient is offline, then the host system 106 determines an appropriate offline away message for the intended recipient (step 550). The host system may determine the appropriate offline away message through a hierarchy of selection. For example, a group away message may take priority over a global away message, and a personal away message may take priority over a group away message. The host system 106 determines whether a global away message, a group away message, or a personal away message, or some combination of these, is appropriate for the intended recipient and selects the message that was stored at the host system in procedure 400. The host system 106 then accesses the appropriate offline away message (step 555) and sends the offline away message to the sender client system 102B (step 560). Finally, the sender client system 102B receives the offline away message selected by the host system 106 (step 565).

Figure 6:
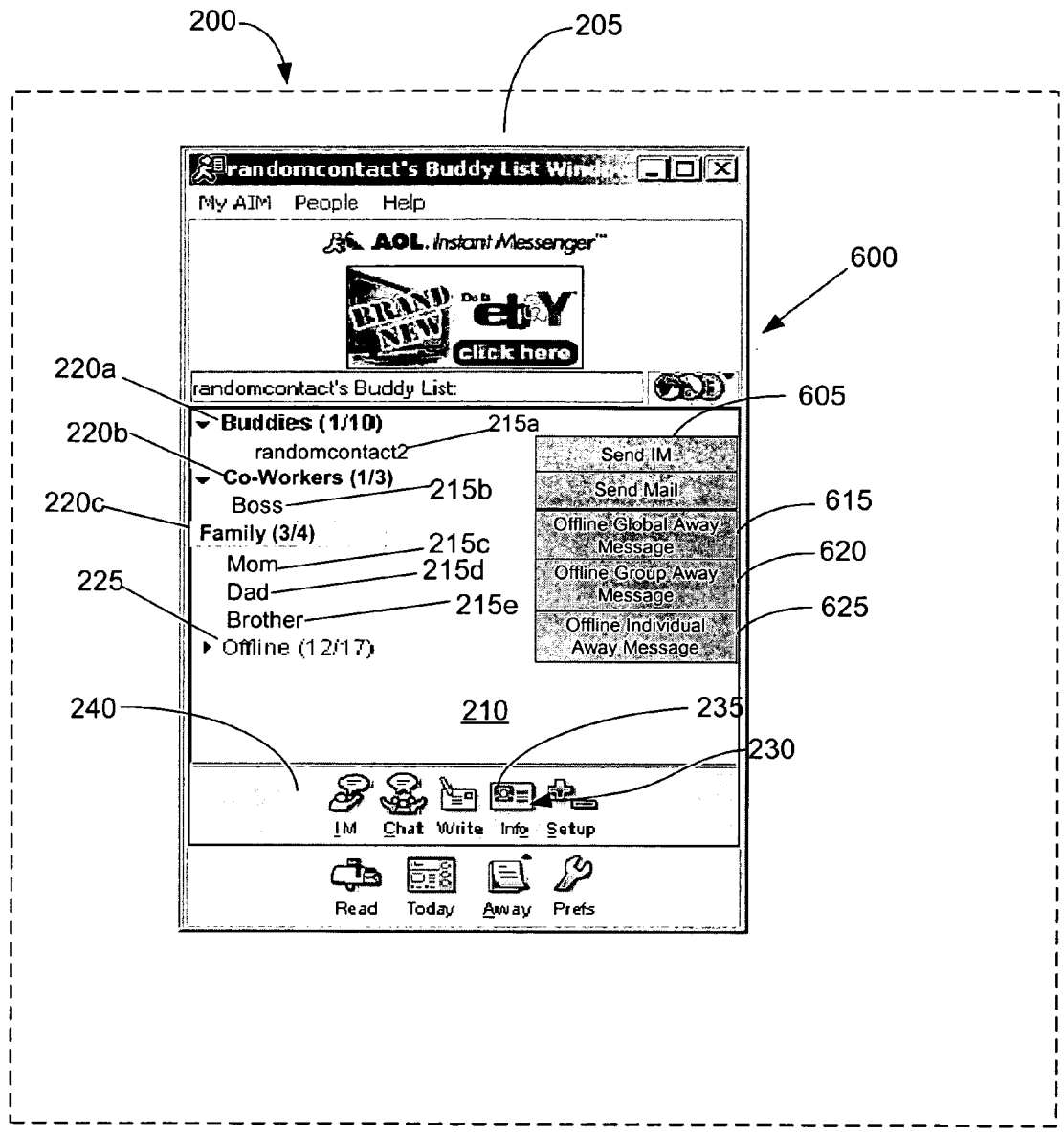
FIGS. 6, 7A, 7B, and 7C are exemplary interfaces that enable a user to set an offline away message.

FIG. 6 illustrates an interface 600 that enables a user to set customized offline away messages on a global basis, a group basis, and a personal buddy basis. The interface 600 includes the IM client program interface 205 and a context menu 605. Context menu 605 may be invoked by using a mouse, for example, while selecting a buddy or a buddy group. For example, context menu 605 can be invoked by positioning the mouse cursor over the Family buddy group representation 220c or the Dad buddy representations 215d while clicking the right button on the mouse.

Context menu 605 provides several options for actions that can be performed. A global away option 615 allows the user to set a global offline away message. A group away option 620 allows the user to set a group offline away message for the buddy group selected. A personal away option 625 allows the user to set a personal offline away message for the personal buddy selected.

Figure 7A:
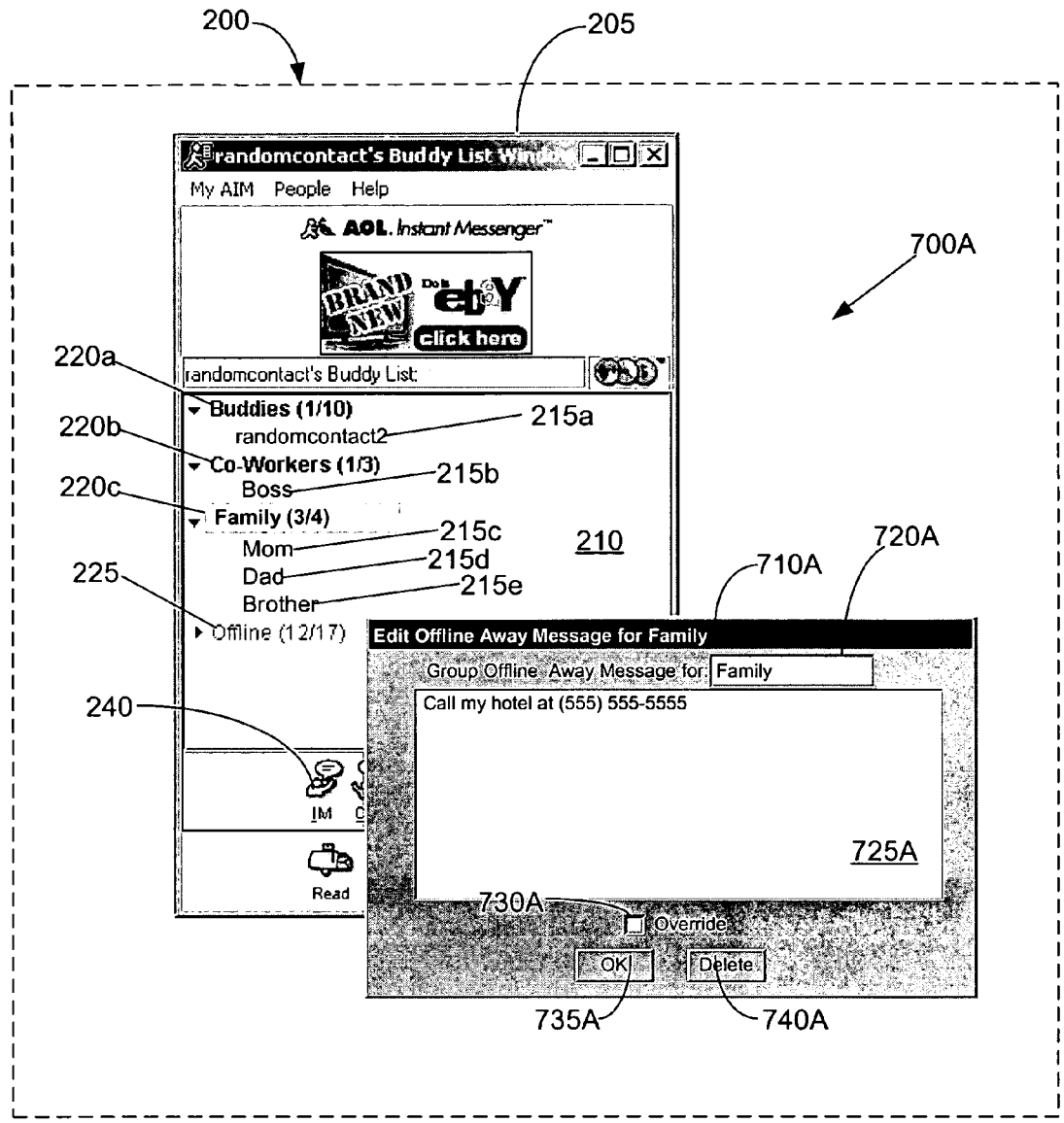

FIG. 7A illustrates an exemplary interface 700A that enables a user to set a group offline away message that applies to a selected group. Interface 700A is provided, for example, when the user has selected the group away message option 620 in context menu 605. Interface 700A includes the IM client program interface 205 and a dialog box 710A. Dialog box 710A includes a text box 720A that contains the name of the buddy group for which the group offline away message is being set (e.g., Family), and which allows for entry/selection of other groups for which group offline away messages are desired. Dialog box 710A also includes an edit box 725A where the user may enter text for the group offline away message.

Dialog box 710A further includes an override checkbox 730A that may be used to indicate whether the text entered into the edit box 725A for the group offline away message is to be appended to a global offline away message or is to replace or override the global offline away message. When checkbox 730A is checked, the text entered into the edit box 725A replaces the global offline away message. When checkbox 730A is not checked, the text entered into the edit box 725A is appended to the global offline away message.

Dialog box 710A includes an OK button 735A and a Delete button 740A. The OK button 735A is used to set the group offline away message using the text entered into edit box 725A. Thus, when checkbox 730A is checked and the OK button 735A is selected, the group offline away message is set to only the text entered into the edit box 725A. When the checkbox 730A is unchecked and the OK button 735A is selected, the group offline away message is set to the concatenation of the global offline away message and the text entered into the edit box 725A. Selecting the Delete button 740A deletes any entered text from edit text box 725A and removes the group offline away message.

Figure 7B:
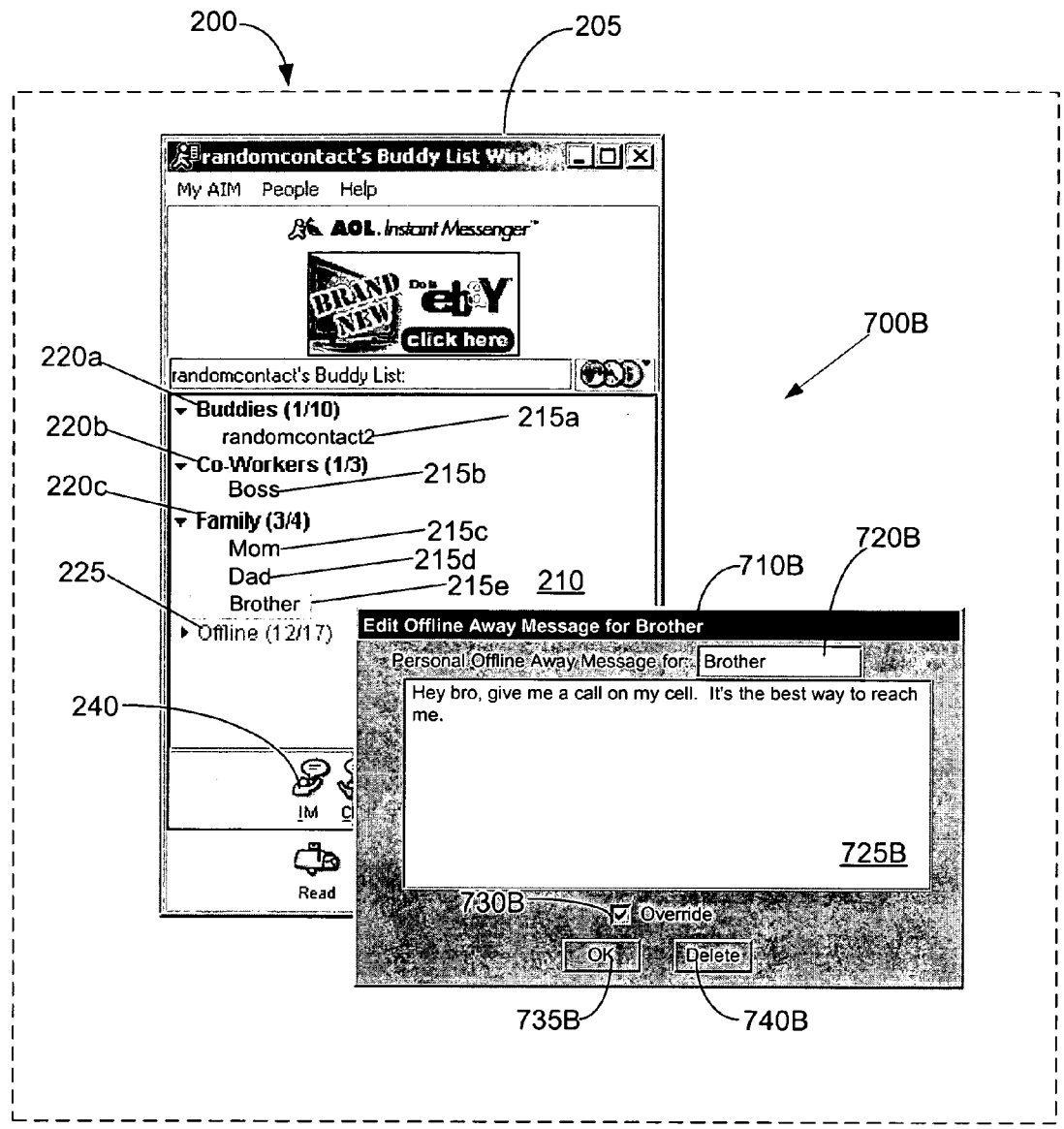

FIG. 7B illustrates an exemplary interface 700B that enables the user to set a personal offline away message for a particular buddy. Interface 700B is provided, for example, when the user has selected the Offline Personal Away Message option 625 in context menu 605. Interface 700B is similar to interface 700A and may include the instant messenger client program interface 205 and a dialog box 710B. Dialog box 710B includes a text box 720B that contains the name of the buddy for which the personal offline away message is being set (e.g., Brother) and which allows for entry or selection of other buddies for whom personal offline away messages are desired. Dialog box 710B also includes an edit box 725B into which the user may enter text for the personal offline away message.

Dialog box 710B further includes an override checkbox 730B that may be used to indicate whether the text entered into the edit box 725B for the personal offline away message is being appended to the global and group away messages (if one or both have been set) or if the text is overriding or replacing the global and group away messages (if one or both have been set). When checkbox 730B is checked, the text entered into the edit box 725B replaces both the global and the group offline away messages. When checkbox 730B is not checked, the text entered into the edit box 725B is appended to the global and group offline away messages (if one or both have been set). In other implementations, separate global and group checkboxes are provided to permit selective appending to, or replacement of, the global and group offline away messages.

Dialog box 710B also includes an OK button 735B and a Delete button 740B. The OK button 735B is used to set the personal offline away message using the text entered into edit box 725B. Thus, when checkbox 730B is checked and the OK button 735B is selected, the personal offline away message is set to just the text entered into the edit box 725B. When the checkbox 730B is unchecked and the OK button 735B is selected, the personal offline away message is set to the global or group offline away message with the text entered into the edit box 725B appended thereto. Selecting the Delete button 740B deletes any entered text from edit box 720B and removes the personal offline away message.

Figure 7C:
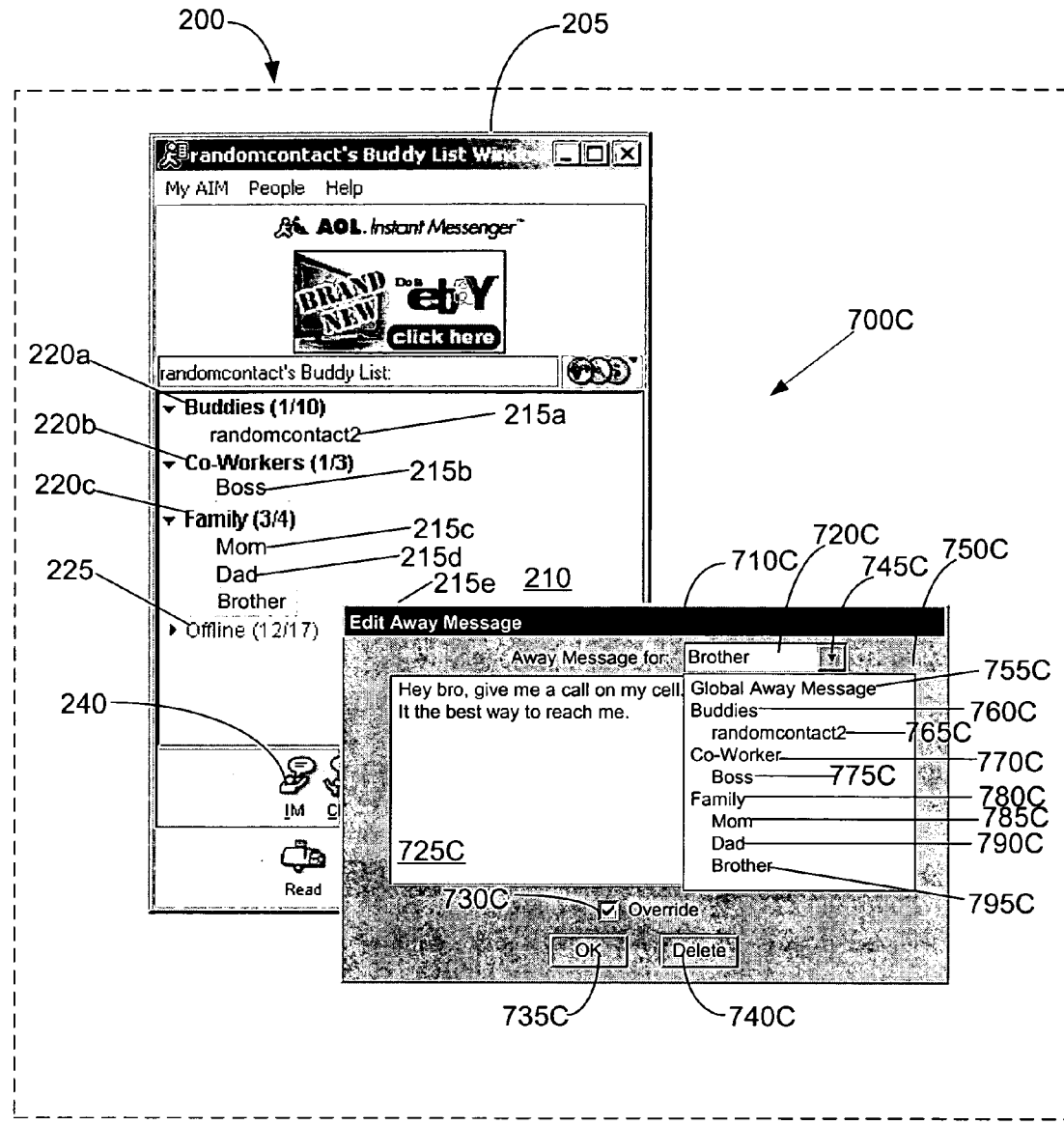

FIG. 7C illustrates an exemplary interface 700C that is provided, for example, when the user has selected one of the global away message, the group away message, or the personal away message from context menu 605. Dialog box 710C can be used to set a global offline away message, group offline away messages, and personal offline away messages. Interface 700C includes a dialog box 710C that includes a combo-box 720C for selecting the type of offline away message and an edit box 725B into which the user may enter text for the offline away message. Combo-box 720C includes a drop-down button 745C that, when selected, causes a pull-down list 750C to be displayed. Pull-down list 750C is populated with the buddy groups and buddies from the buddy list, in addition to an option for the global offline away message. To set a message, the user selects the global offline away message, the buddy group, or the buddy from the populated list and types the message into edit box 725C. In this way, the user can select the buddy group or buddy for which a message is to be set, without having to type the name of the buddy group or buddy.

Dialog box 710C also includes a checkbox 730C that may be used to indicate whether the text entered into the edit box 725C for the offline away message is being appended to or replacing the other away messages (if they have been set). When checkbox 730C is checked, the text entered into the edit box 725C replaces the other offline away messages. When checkbox 730C is not checked, the text entered into the edit box 725C is appended to the other offline away messages (if one or both have been set). For example, if the user selects a personal away message and checks the box 725C, the personal away message for that buddy will replace any global away message that has been set and any group away message that has been set for the group in which that buddy resides.

Dialog box 710C also includes an OK button 735C and a Delete button 740C. The OK button 735C is used to set the offline away message using the text entered into edit box 725C. Thus, when checkbox 730C is checked and the OK button 735C is selected, the offline away message is set to just the text entered into the edit box 725C. When the checkbox 730C is unchecked and the OK button 735C is selected, the personal offline away message is set to the other offline away message(s) with the text entered into the edit box 725C appended thereto. Selecting the Delete button 740C deletes any entered text from edit box 720C and removes the offline away message.

Dialog boxes 710A, 710B, and 710C may be designed to show the messages (i.e., group offline away message or global offline away message) that the new message is to replace or to which the new message is to be appended. Also, the display of checkboxes 730A, 730B, and 730C in dialog boxes 710A, 710B, and 710C may be conditioned on the actual existence of other message(s) to be replaced or appended. For example, if a global offline away message does not exist, the checkbox 730A may not be visible.

Figure 8A:
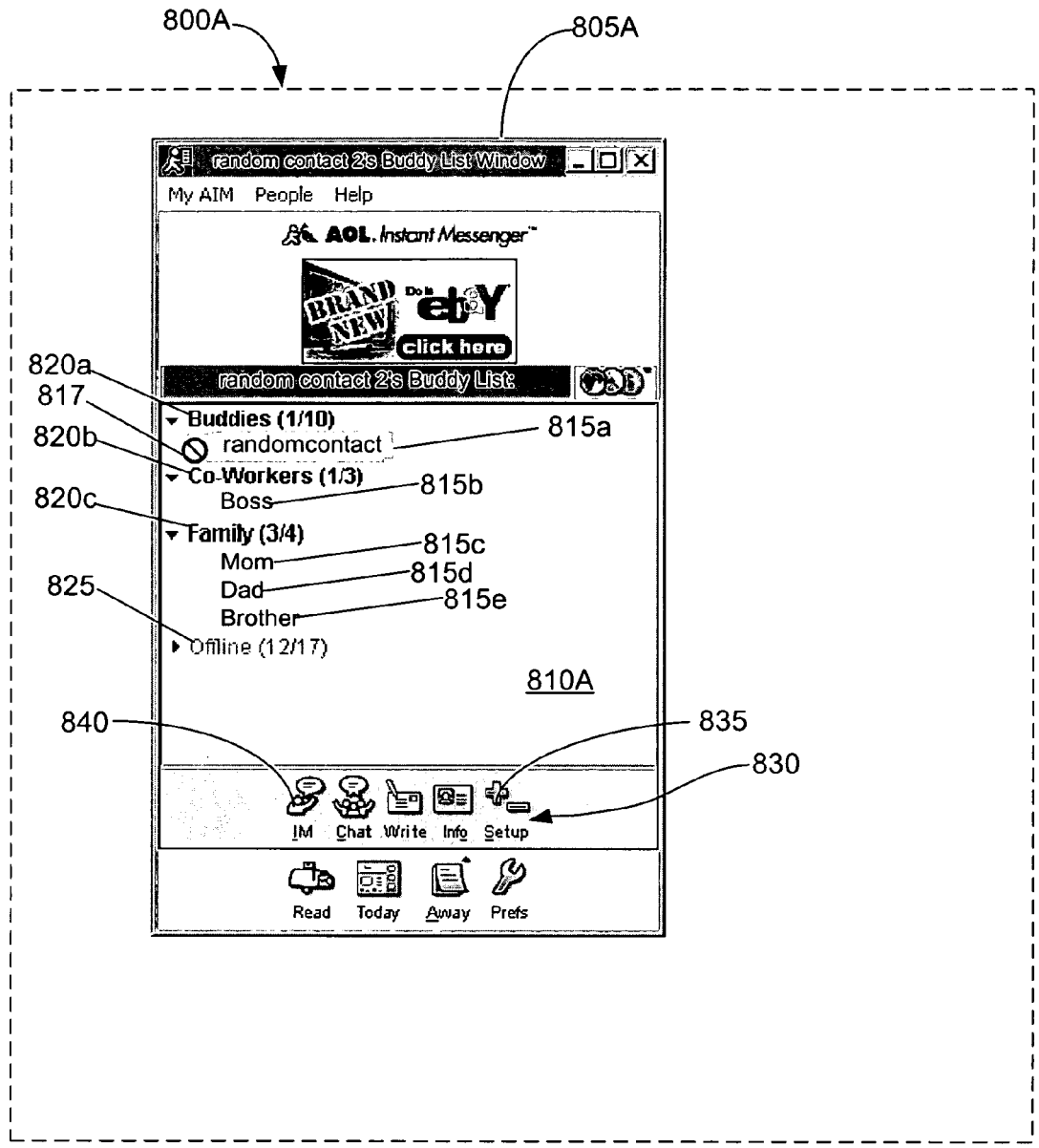
FIGS. 8A, 8B, and 8C are exemplary interfaces presented to a user.
Figure 8B:
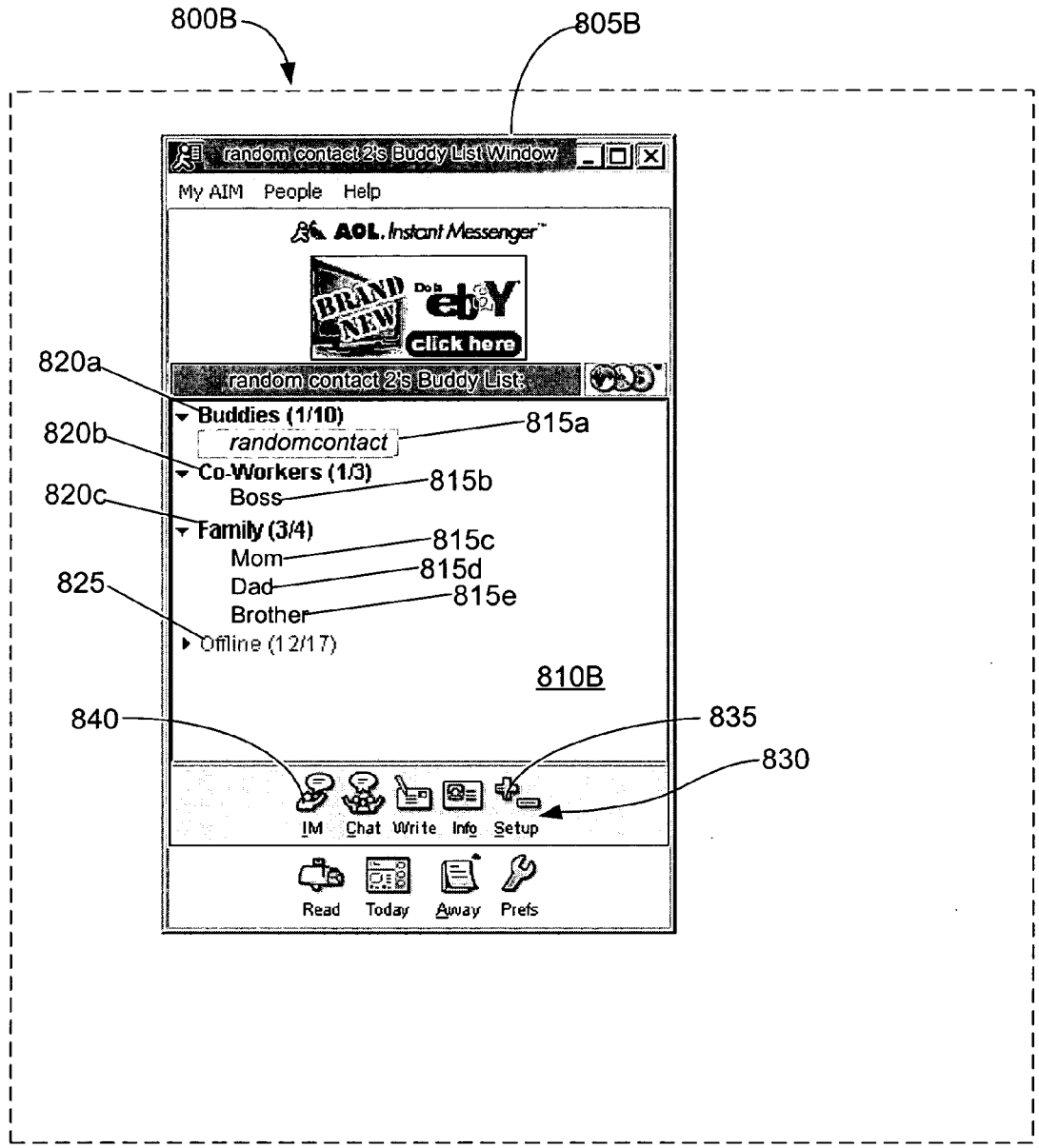
Figure 8C:
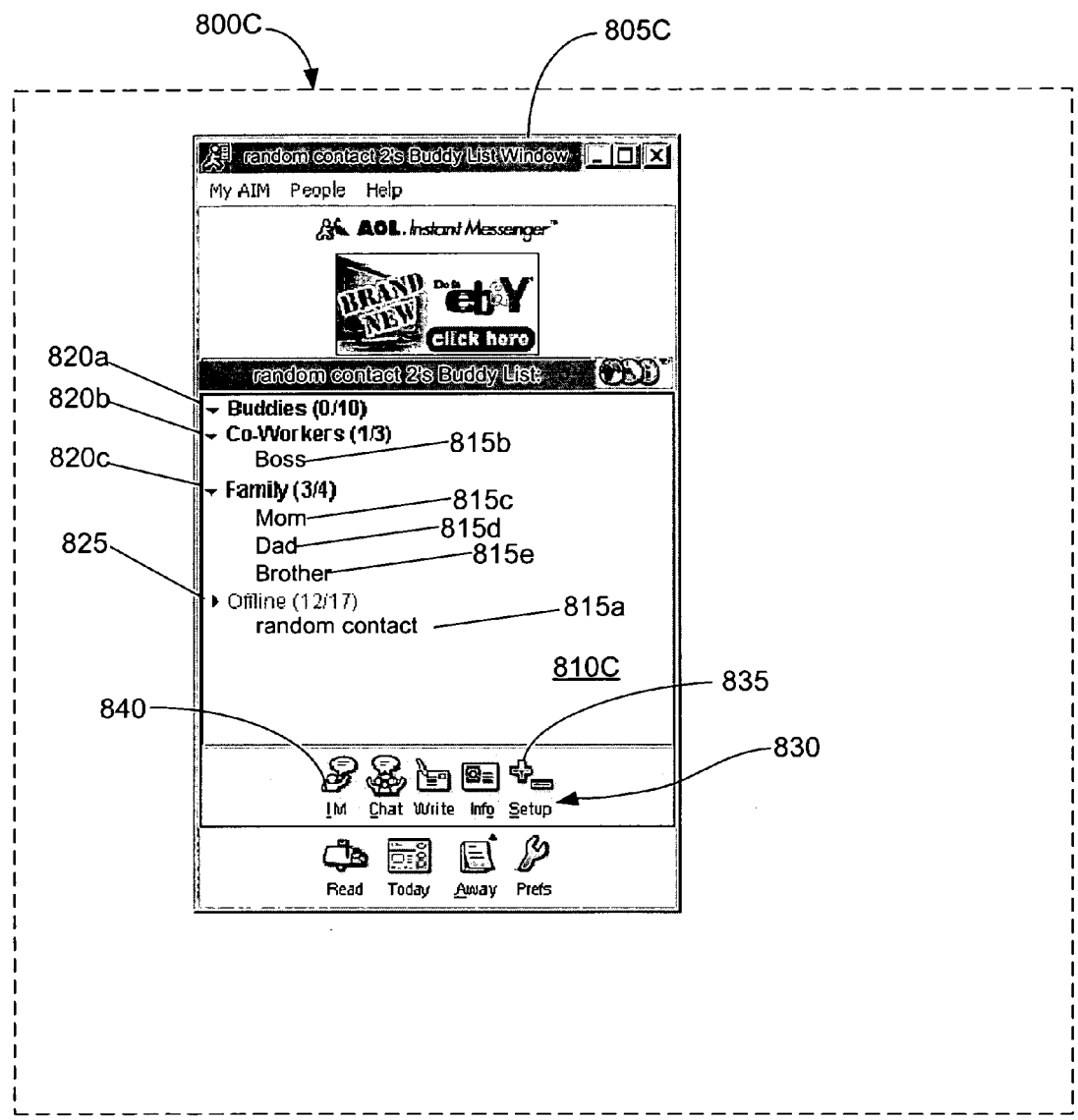

FIGS. 8A-8C illustrate exemplary IM buddy lists in the form of, respectively, UI 805A, 805B, and 805C on desktops 800A, 800B, and 800C. The examples of FIGS. 8A, 8B, and 8C are shown from the perspective of an IM sender ("random contact 2") who is using a sender client system such as sender client system 102B as discussed with respect to procedure 500. The user ("random contact 2") will use the buddy list UIs 805A, 805B, and 805C to send an instant message to a recipient who is offline. Each of UIs 805A, 805B, and 805C displays an offline recipient in a different exemplary manner.

FIG. 8A shows an exemplary UI 805A on desktop 800A. In UI 805A, the user ("random contact 2") has selected other users to be on the buddy list UI 805A. The buddy list UI 805A has a box 810A that displays representations 815a-815e of the user's buddies. In the UI 805A, the representations 815a-815e are icons showing the screen names of the buddies. However, other forms of representation may be used. The buddies 815a-815e are grouped in various groups 820a-820c. For example, the buddy "randomcontact" 815a is grouped under the Buddies group 820a. An offline icon 817 is displayed adjacent to the screen name randomcontact 815a. The offline icon 817 indicates that buddy 815a is offline. Nevertheless, the user random contact 2 may be enabled to send an instant message to offline buddy randomcontact.

Referring to FIG. 8B, a buddy list UI 805B is displayed on desktop 800B. UI 805B is similar to UI 805A. However, the offline buddy randomcontact 815a is displayed in a different manner to indicate that the buddy randomcontact 815a is offline. In particular, the offline buddy randomcontact 815a is displayed using an italicized font, while the other users 815b-815e, all of whom are online, are displayed in a normal font.

Referring to FIG. 8C, a buddy list UI 805C is shown on desktop 800C. In the exemplary buddy list UI 805C, the offline buddy randomcontact 815a is displayed under the offline buddies group 825 to indicate that the buddy randomcontact 815a is offline. In contrast, the buddies displayed under groups 820a, 820b and 820c are online.

FIGS. 9A-9D show IM: windows 970 displaying exemplary offline away messages presented to buddies attempting to communicate with the user. As with window 270, each of the windows 970 includes a titlebar 975 in which the buddy's screenname ("randomcontact") is shown. Each window 970 also includes a text box 980 in which sent and received messages appear, and an edit box 985 in which messages are entered.

Figure 9A:
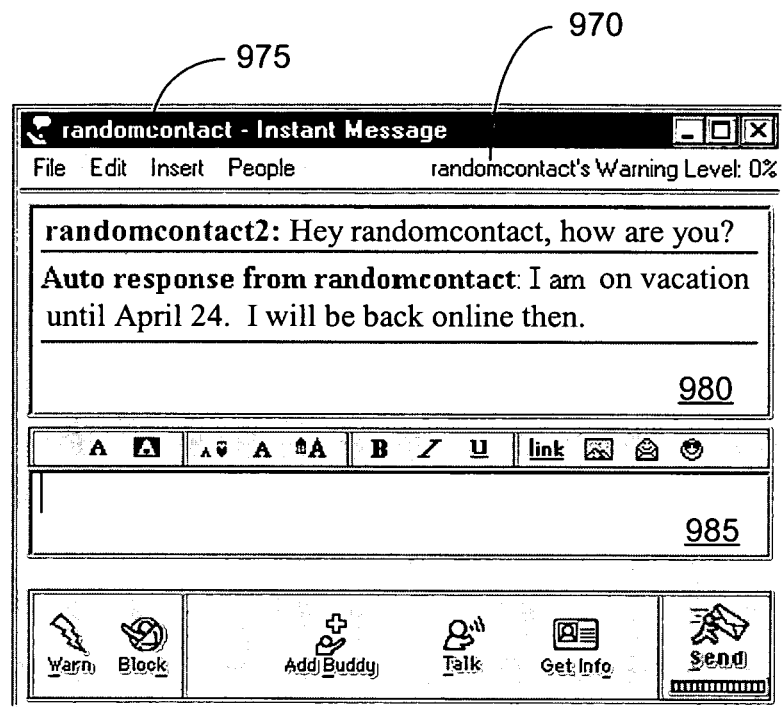
FIGS. 9A-9D and 10 are exemplary instant messaging windows displaying exemplary offline away messages.

As shown in FIG. 9A, randomcontact has configured a global offline away message for all buddies as "I am on vacation until April 24. I will be back online then." FIG. 9A shows the response when randomcontact2 attempts to communicate with randomcontact. Randomcontact2 sent an instant message to randomcontact saying "Hey randomcontact, how are you?" Because randomcontact has not set a group offline away message for the Buddies buddy group (of which randomcontact2 is a part) and has not set a personal offline away message for randomcontact2, randomcontact2 receives an auto-response with the global offline away message, "I am on vacation until April 24. I will be back online then."

Figure 9B:
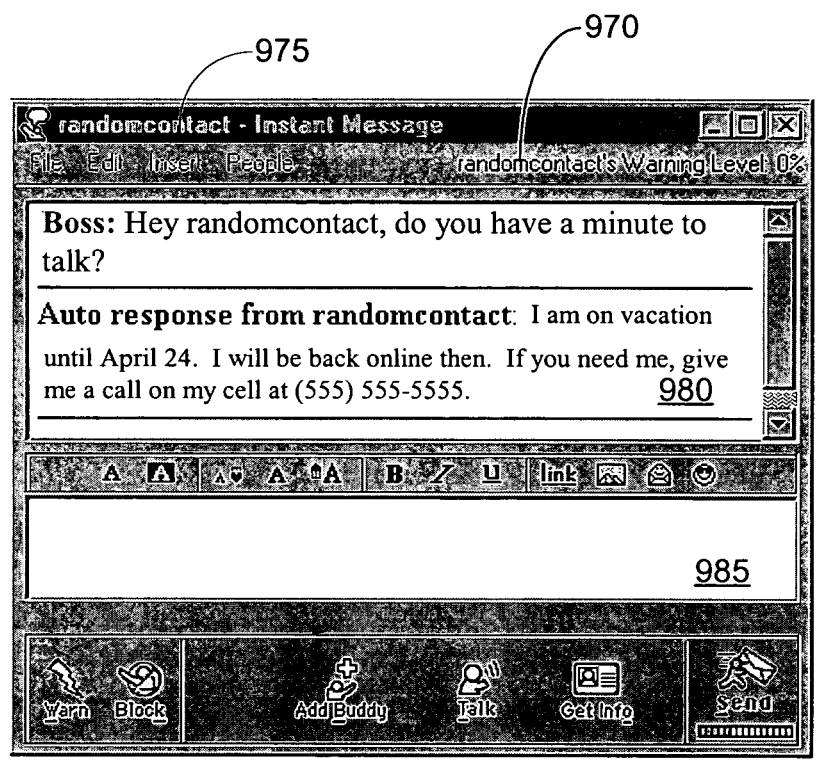

As shown in FIG. 9B, randomcontact has set a group offline away message for the Co-Workers group by appending "If you need me, give me a call on my cell at (555) 555-5555." to the global away message. FIG. 9B shows the response when Boss attempts to communicate with randomcontact. Boss sent an instant message to randomcontact saying "Hey randomcontact, do you have a minute to talk?" Because randomcontact has set a group offline away message for the Co-Workers group (the group that includes Boss), but has not set a personal offline away message for Boss, Boss receives an auto-response with the Co-Worker group default offline away message, "I am on vacation until April 24. I will be back online then. If you need me, give me a call on my cell at (555) 555-5555."

Figure 9C:
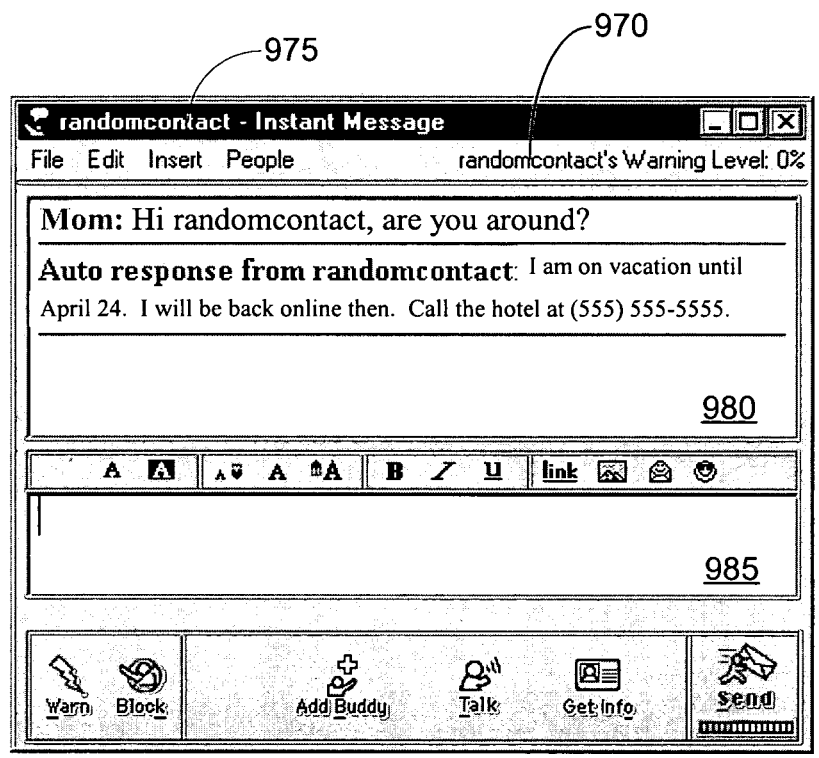

As shown in FIG. 9C, randomcontact has set a group offline away message for the Family group by appending "Call the hotel at (555) 555-5555." to the global away message. FIG. 9C shows the response when Mom attempts to communicate with randomcontact. Mom sent an instant message to randomcontact saying "Hi randomcontact, are you around?" Because randomcontact has set a group offline away message for the Family group (the group that includes Mom), but has not set a personal offline away message for Mom, Mom receives an auto-response with the Family group offline default message, "I am on vacation until April 24. I will be back online then. Call the hotel at (555) 555-5555."

Figure 9D:
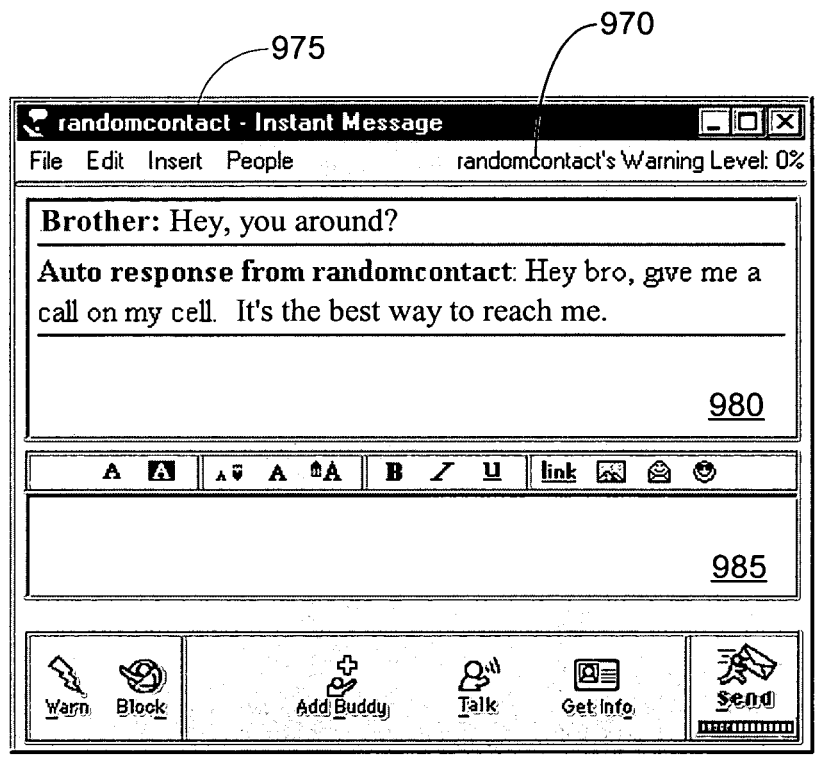

As shown in FIG. 9D, randomcontact has set a personal offline away message for Brother by overriding the global away message and the Family group away message, and replacing them with "Hey Bro, give me a call on my cell. It's the best way to reach me." FIG. 9D shows the response when Brother attempts to communicate with randomcontact. Brother sent an instant message to randomcontact saying "Hey, you around?" Because randomcontact has set a personal offline away message for Brother by overriding the global away message and the Family away message, Brother receives an auto response with only the personal offline away message, "Hey bro, give me a call on my cell. It's the best way to reach me."

Figure 10:
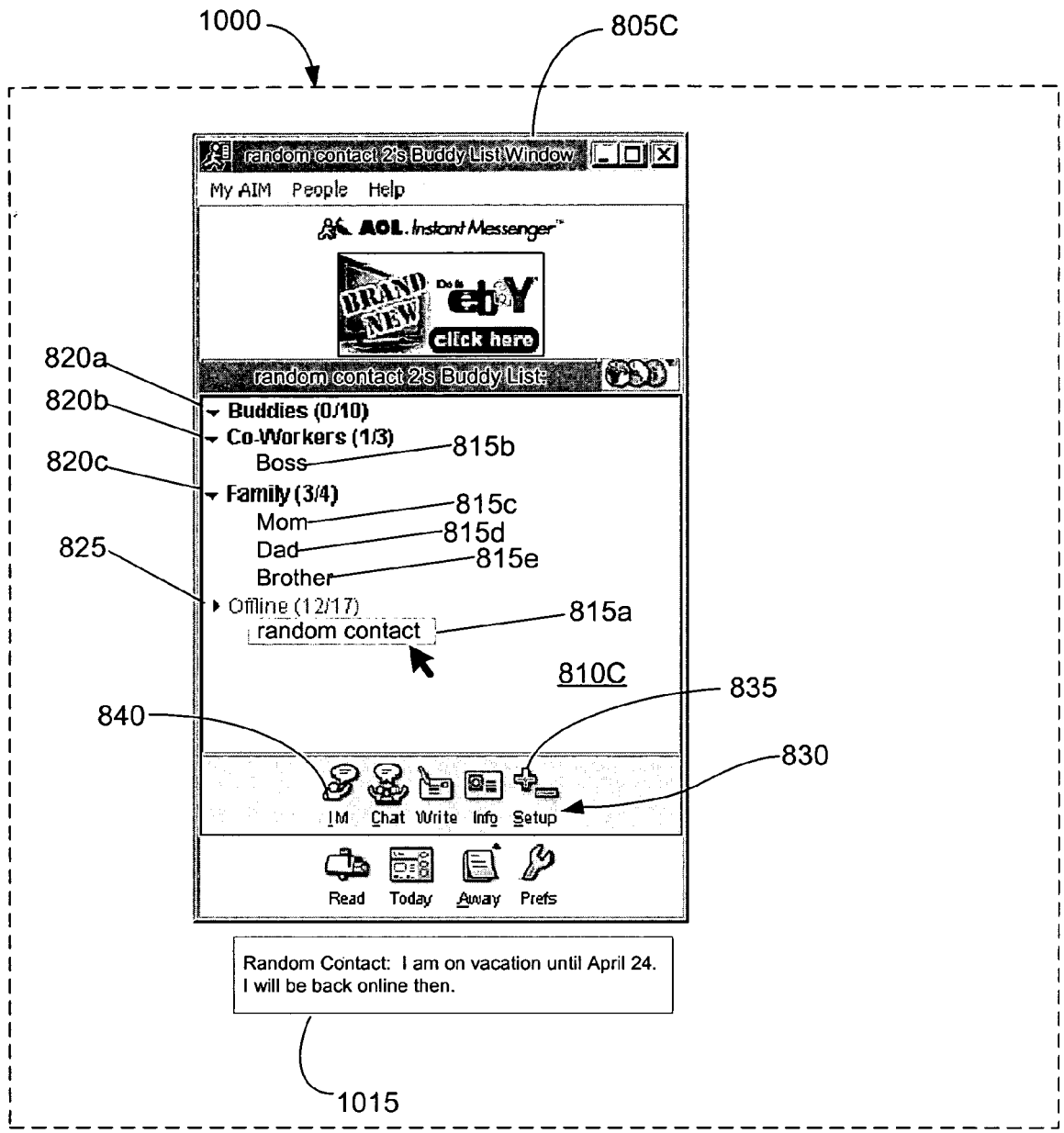

FIG. 10 shows the response when random contact 2 attempts to communicate with randomcontact using the UI 805C discussed in FIG. 8C. Random contact 2 uses a mouse or other pointer or user input device 1010 to hover over the screen name of randomcontact 815a displayed in box 810 of UI 805C. When the mouse 1010 comes in proximity to the screen name of random contact 815A, a window 1015 pops up on the desktop 1000 containing the offline away message from randomcontact "I am on vacation until April 24. I will be back online then." The global message was used because randomcontact has not set a group offline away message for the buddies group or a personal offline away message for random contact 2. Random contact 2 receives the auto response with the global offline away message.

The window 1015 may be rendered in any location on the display. The window 1015 contains the appropriate offline away message. For example, window 1015 may contain the offline away message determined by the host system 106 in step 550 of procedure 500 discussed above with respect to FIG. 5. In one implementation, the window 1015 is activated as soon as the mouse 1010 or other user input device is positioned proximate to or directly over the representation 815 of the buddy randomcontact. In another implementation, the window 1015 is activated and rendered after the mouse 1010 or other user input device remains proximate to or positioned over the representation 815a of buddy randomcontact for a predetermined threshold amount of time or after some overt selection activity using the mouse 1010 or other user input device. In yet another implementation, the window 1015 may be activated by positioning the mouse 1010 or other user input device over or proximate to other features of the UI.

Display of the window 1015 may be maintained until revoked. Display of the window 1015 may be revoked upon expiration of a predetermined amount of time or if the user takes some action to implicitly command the removal of the window 1015 (e.g., moving the mouse or other user input device away from the position used to trigger the window 1015). For example, the window 1015 may be automatically closed or deactivated if the user moves the mouse or the input device or if the mouse or the input device is moved from a position over or proximate to the representation 815 of buddy random contact.

While the techniques have been described primarily with respect to IM applications, they may be applied to other communications programs with online presence such as chat programs.

A number of implementations have been described. Nevertheless, it will be understood that various modifications may be made. Accordingly, other implementations are within the scope of the following claims.

What is claimed is:

1. A method for providing away messages to buddies of an instant messaging program user, the method comprising:

providing an interface that displays a representation of a buddy group and a representation of a buddy included in the buddy group, wherein the representation of the buddy group and the representation of the buddy are displayed in a manner that indicates the buddy is included in the buddy group;

enabling the user to set a global away message using the interface;

enabling the user to set a group away message for the buddy group using the interface;

enabling the user to set a personal away message for the buddy using the interface;

sending one or more of the global away message, the group away message, and the personal away message to the buddy in response to the buddy attempting to communicate with the user through the instant messaging program when the user is offline; and enabling the user to append the personal away message to one or both of the global away message and the group away message using the interface.

2. The method of claim 1 wherein the personal away message is appended to the group away message, which is appended to the global away message if the user has set the personal away message.

3. The method of claim 1 wherein the group away message is appended to the global away message if the user has set the group away message.

4. The method of claim 1 further comprising enabling the user to append the group away message to the global away message using the interface.

5. The method of claim 1, wherein sending one or more of the global away message, the group away message, and the personal away message to the buddy includes sending one or more of the global away message, the group away message, and the personal away message to the buddy in response to receiving a message directed to the user from the buddy when the user is offline.

* * * * *